United States Patent
Hung

(10) Patent No.: US 6,694,868 B1
(45) Date of Patent: Feb. 24, 2004

(54) DETACHABLE PAN HANDLE STRUCTURE

(76) Inventor: Ming-Tsun Hung, PO Box 82-144, Taipei (TW)

( * ) Notice: Subject to any disclaimer, the term of this patent is extended or adjusted under 35 U.S.C. 154(b) by 26 days.

(21) Appl. No.: 10/426,854

(22) Filed: May 1, 2003

(51) Int. Cl.[7] .......................... A47J 27/00; A47J 37/00; A47J 45/06; A47J 45/07; B65D 25/28

(52) U.S. Cl. ........................ 99/403; 99/422; 16/422; 16/425; 220/759

(58) Field of Search .................... 99/337, 338, 340, 99/403, 410, 422–425, 449, 646 R; 16/110.1, 422–428, 406, 413; 220/759, 770; 294/34, 31.1

(56) References Cited

U.S. PATENT DOCUMENTS

| | | | | | |
|---|---|---|---|---|---|
| 1,364,552 | A | * | 1/1921 | Hill, Jr. ....................... | 220/759 |
| 2,478,784 | A | * | 8/1949 | Serio .......................... | 294/31.1 |
| 3,616,964 | A | * | 11/1971 | Yamazaki ..................... | 220/753 |
| 4,825,505 | A | * | 5/1989 | Witte .......................... | 16/425 |
| 5,373,608 | A | * | 12/1994 | Welch ......................... | 16/425 |
| 5,673,458 | A | * | 10/1997 | Raoult ......................... | 16/425 |
| 5,704,092 | A | * | 1/1998 | Nicollet et al. ................ | 16/425 |
| 6,237,471 | B1 | * | 5/2001 | Nam ........................... | 99/422 |
| 6,250,493 | B1 | * | 6/2001 | Kwan .......................... | 220/759 |
| 6,257,439 | B1 | * | 7/2001 | Hsu ............................ | 220/759 |
| 6,298,775 | B1 | * | 10/2001 | Chen ........................... | 99/422 |
| 6,393,973 | B1 | * | 5/2002 | Velo et al. .................... | 99/422 |

* cited by examiner

Primary Examiner—Timothy F. Simone
(74) Attorney, Agent, or Firm—Leong C. Lei

(57) ABSTRACT

A detachable pan handle structure includes a pan body and a handle. The bottom section of the handle of the pan is provided with an arch-shaped actuating block. The bottom side of the actuating block is connected to the handle, and the other three sides of the block are positioned with an open slot, the actuating block has one side being connected and three other sides of the block are opened without a connection, so that the actuating block can be bent downward and can be withdraw from an engaging hole thereby enabling the pan handle to be detached from the body of a pan.

3 Claims, 4 Drawing Sheets

DETACHABLE PAN HANDLE STRUCTURE

BACKGROUND OF THE INVENTION (a) Technical Field of the Invention

The present invention relates to structure of a pan handle, and in particular, a handle having an actuating block mounted with a stopping block. The actuating block can be bent downward and can be withdraw from an engaging hole. The pan handle can be detached from the body of a pan.

(b) Description of the Prior Art

The use of a pan handle is known in the prior art. More specifically, a pan handle heretofore devised and utilized are known to consist basically of familiar, expected and obvious structural configurations, notwithstanding the myriad of designs encompassed by the prior art which have been developed to fulfill certain objectives and requirements.

Most of the conventional pan handles are fitted permanently to the pan, or fitted with screws or spring. However, these handles are either not possible to be detached from the pan or fitted by means of screws. If it is required the handle can be detached with tools. This process of unscrewing is laborious and the detachment of the handle requires tools.

SUMMARY OF THE INVENTION

Accordingly, it is an object of the present invention to provide a detachable pan handle structure comprising a pan body, and a handle, characterized in that the bottom section of the handle of the pan is provided with an arch-shaped actuating block, and the bottom side of the actuating block is connected to the handle, and the other three sides of the block are positioned with an open slot, the actuating block has one side being connected and three other sides of the block are opened without a connection, such that, when the actuating block is pressed, a downward bending at one side is obtained, and the upper edge face of the actuating block is mounted with an engaging block which can be protruded, and the engaging block is corresponding to the engaging hole of a securing plate body at the lateral side of the pan.

Yet a further object of the present invention is to provide a detachable pan handle structure, wherein the upper portion of the handle is provided with an engaging slot having engaged with a covering plate and a retractable press block which can be retracted up and down is mounted on the covering plate, and the engaging slot and the covering plate and corresponding to the edge face at the lateral side of the open slot of the actuating block.

A further object of the present invention is to provide a detachable pan handle structure, wherein the bottom face of the press block is corresponding to the upper edge face at the lateral side of the actuating block and an insertion slot is provided to the edge of the inner side of the handle, and the insertion hole passes through the engaging slot.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
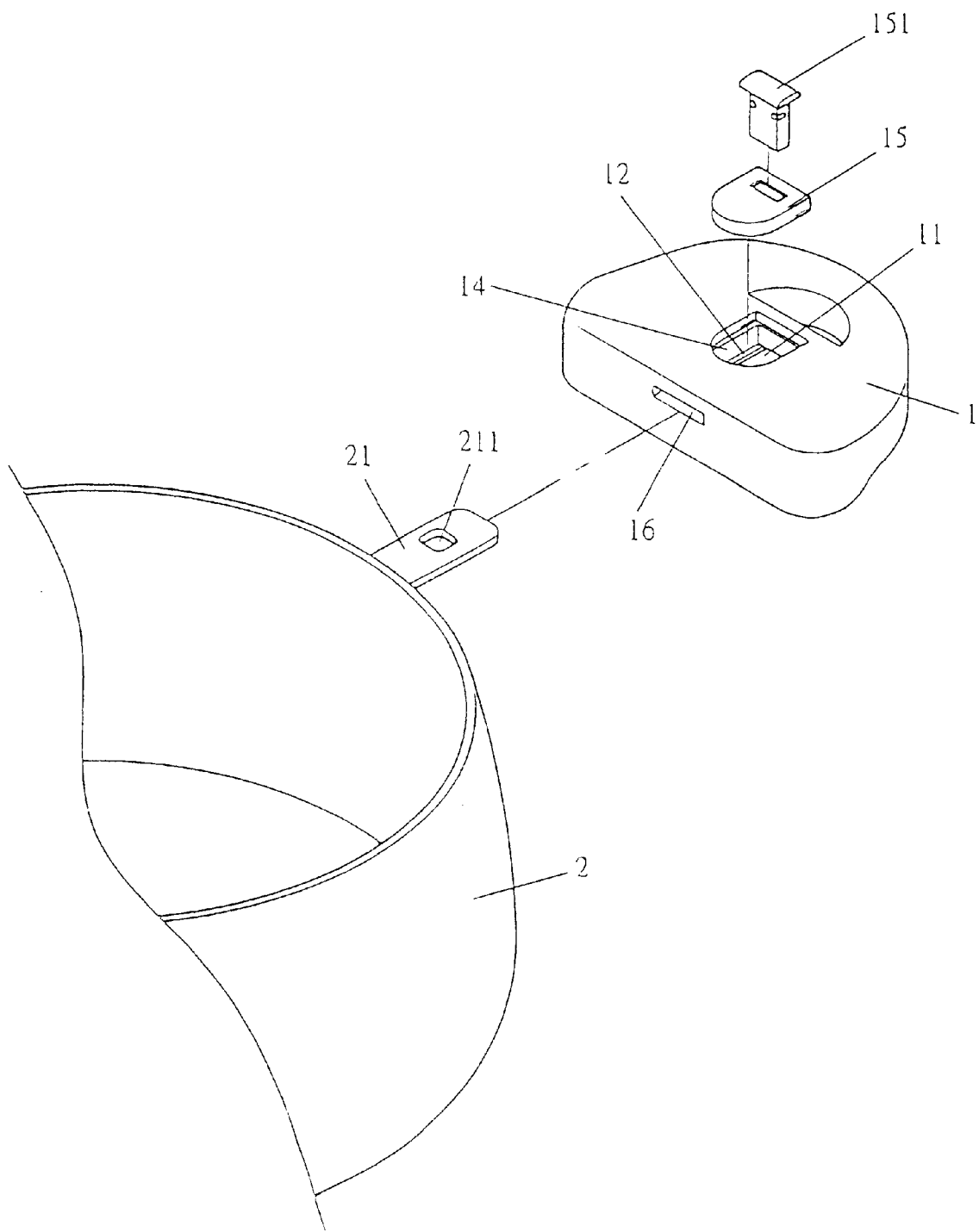
FIG. 1 is a perspective exploded view of a handle for pan in accordance with the present invention.
Figure 2:
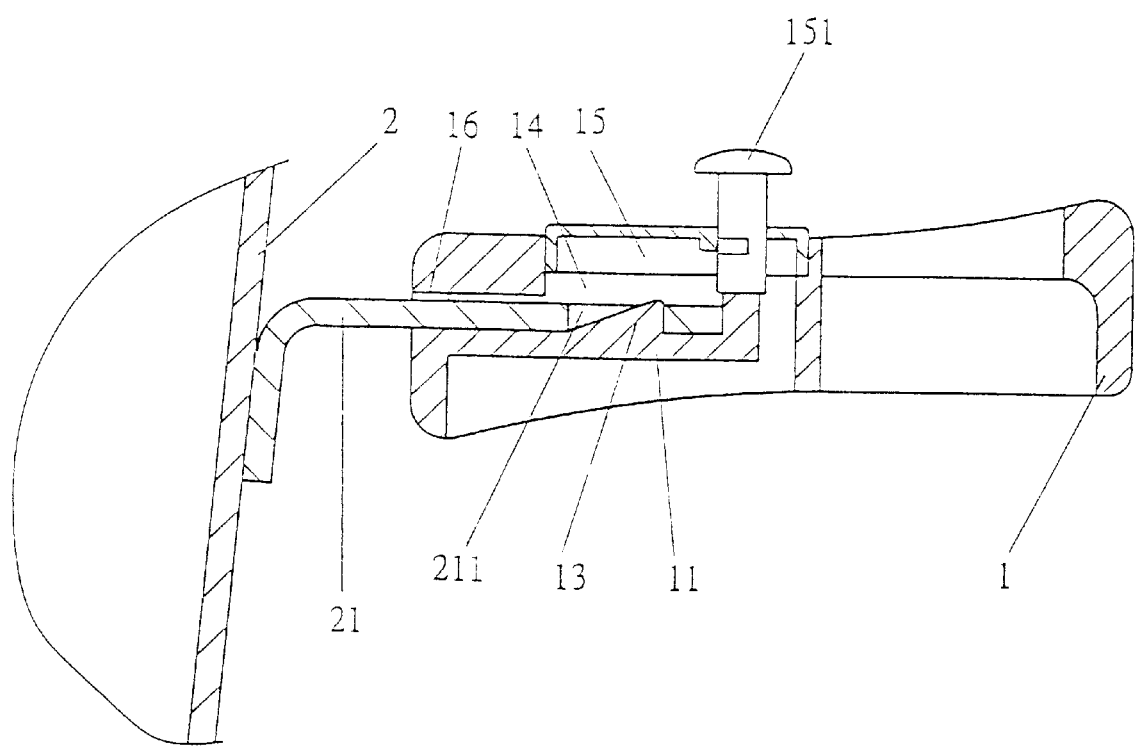
FIG. 2 is a sectional view of the handle for the pan in accordance with present invention.
Figure 3:
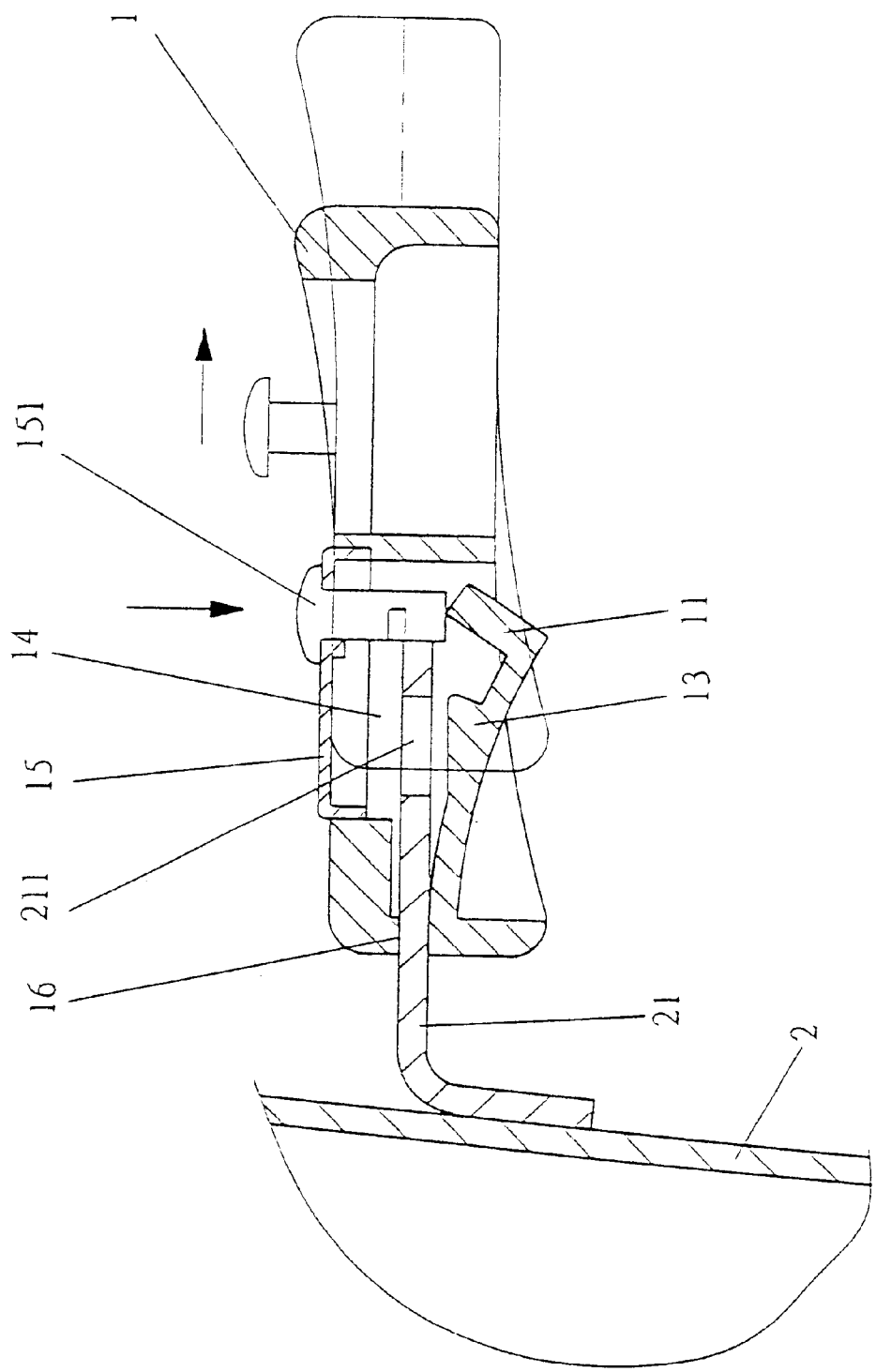
FIG. 3 is a schematic view showing the action of the handle in accordance with the present invention.

Referring to FIGS. 1 to 3, there is shown a pan handle structure of the present invention comprising a pan 2 and a handle 1.

Figure 4:
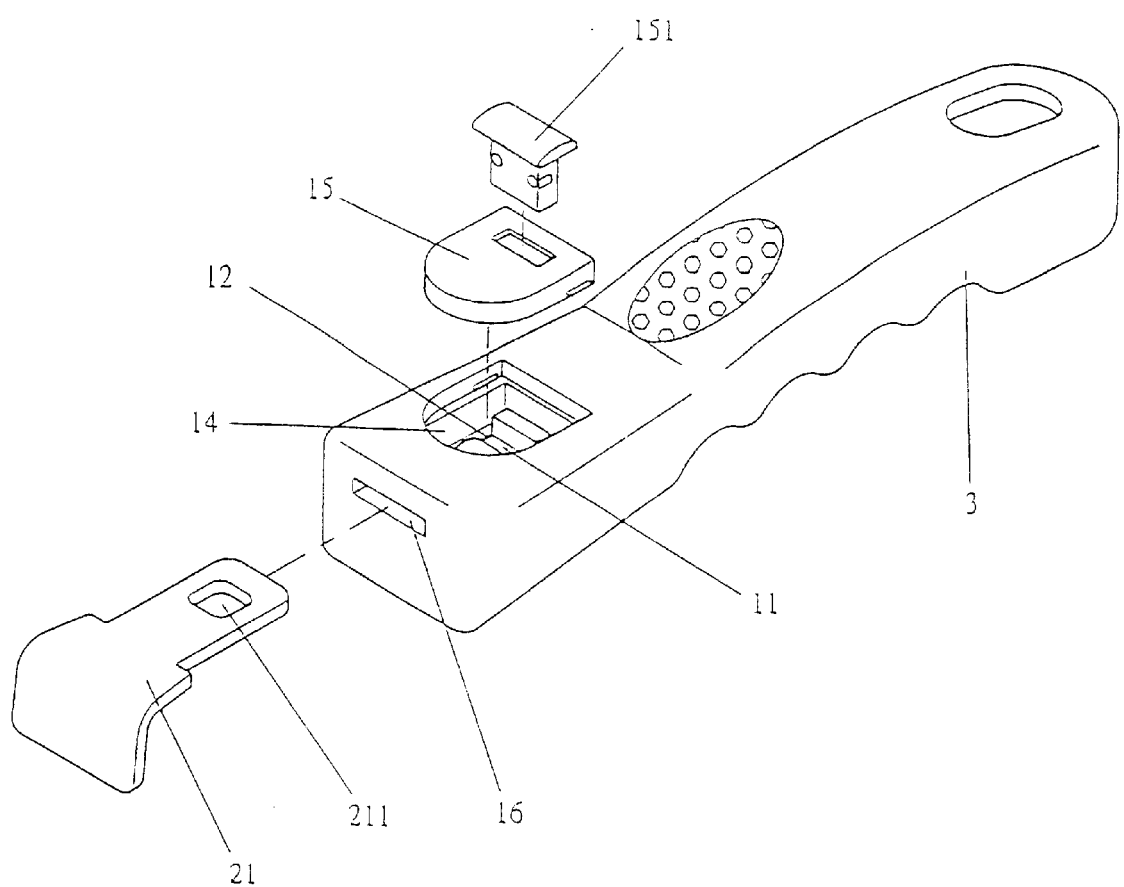
FIG. 4 is a perspective exploded view of a further pan handle in accordance with the present invention.

In a preferred embodiment of the present invention, the bottom section of the handle 1 of the pan 2 is provided with an arch-shaped actuating block 11. The bottom side of the actuating block 11 is connected to the handle 2, and the other three sides of the block 11 are positioned with an open slot 12. The actuating block 11 has one side being connected and three other sides of the block 11 are opened without a connection. Thus, when the actuating block 11 is pressed, a downward bending at one side is obtained. The upper edge face of the actuating block 11 is mounted with an engaging block 13 which can be protruded. The engaging block 13 is corresponding to the engaging hole 211 of a securing plate body 21 at the lateral side of the pan 2, and the size of the engaging block 113 can be engaged at the engaging hole 211. The upper portion of the handle is provided with an engaging slot 14 having engaged with a covering plate 15. A retractable press block 151 which can be retracted up and down is mounted on the covering plate 15, and the engaging slot 14 and the covering plate 15 and corresponding to the edge face at the lateral side of the open slot 12 of the actuating block 11, and the bottom face of the press block 151 is corresponding to the upper edge face at the lateral side of the actuating block 11. An insertion hole 16 is provided to the edge of the inner side of the handle 1, and the insertion hole 16 passes through the engaging slot 14. The size of the insertion hole 16 allows the securing plate body 21 at the lateral side of the pan 2 to be inserted. The handle 1, by way of depressing the press block 151, urges one side of the actuating block 11 to move downward. The actuating block 11, employing the arch-shaped open slot 12, design, causes one of the side to move downward, and the stopping block 13 on the actuating block 11 to move down to withdraw from the engaging hole 211 of the securing plate body 21. The handle 1 is pulled out from the securing plate body 21, and as a result of the elasticity of the actuating block 11, the press block 151 is urged to its original position. On the contrary, the handle 1 can be mounted to the securing plate body 21 of the pan 2, and the handle 1 can also be made into an elongated handle 3, as shown in FIG. 4. In view of the above, the handle structure can be separated from the pan.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. In a detachable pan handle structure comprising a pan body and a handle, the improvement comprising wherein the bottom section of the handle of the pan is provided with an arch-shaped actuating block, and bottom side of the actuating block is connected to the handle, and the other three sides of the block are positioned with an open slot, the actuating block has one side being connected and three other sides of the block are opened without a connection, such that, when the actuating block is pressed, a downward bending at one side is obtained, and an upper edge face of the actuating block is mounted with an engaging block which can be protruded, and the engaging block is corresponding to an engaging hole of a securing plate body at the lateral side of the pan, and the upper portion of the handle is provided with an engaging slot having engaged with a covering plate and a retractable press block which can be retracted up and down is mounted on the covering plate, and the engaging slot and the covering plate and corresponding to the edge face at the lateral side of the open slot of the actuating block, the bottom face of the press block is corresponding to the upper edge face at the lateral side of the actuating block and an insertion hole is provided to the edge of the inner side of the handle, and the insertion hole passes through the engaging slot.

2. The pan handle structure of claim 1, wherein the upper portion of the handle is provided with an engaging slot having engaged with a covering plate and a retractable press block which can be retracted up and down is mounted on the covering plate, and the engaging slot and the covering plate and corresponding to the edge face at the lateral side of the open slot of the actuating block.

3. The pan handle structure of claim 1, wherein the bottom face of the press block is corresponding to the upper edge face at the lateral side of the actuating block and an insertion slot is provided to the edge of the inner side of the handle, and the insertion hole passes through the engaging slot.

* * * * *